United States Patent [19]

Krutzner, Jr.

[11] 4,192,643

[45] Mar. 11, 1980

[54] APPARATUS FOR HEAT TREATING FINE-GRAIN SOLIDS

[75] Inventor: Karl Krutzner, Jr., Beckum, Fed. Rep. of Germany

[73] Assignee: Polysius AG, Beckum, Fed. Rep. of Germany

[21] Appl. No.: 940,261

[22] Filed: Sep. 7, 1978

[30] Foreign Application Priority Data

Sep. 19, 1977 [DE] Fed. Rep. of Germany ....... 2742099

[51] Int. Cl.² .............................................. F27B 7/02
[52] U.S. Cl. ....................................... 432/106; 432/58
[58] Field of Search ........................... 432/14, 58, 106; 106/100

[56] References Cited

U.S. PATENT DOCUMENTS

| | | | |
|---|---|---|---|
| 3,692,287 | 9/1972 | Kohl et al. ........................... | 106/100 |
| 3,784,389 | 1/1974 | Hastrud ................................ | 432/106 |

FOREIGN PATENT DOCUMENTS 2255068  5/1974 Fed. Rep. of Germany ............. 432/58

*Primary Examiner*—John J. Camby
*Attorney, Agent, or Firm*—Marshall & Yeasting

[57] ABSTRACT

A rotary tubular kiln and a preheater for material supplied to the kiln are connected by a duct leading from one end of the kiln, for conducting waste gases from the kiln to the preheater. A bypass conduit is connected to said duct for diverting part of said waste gases and extends from the duct in such a direction as to divert a stream of waste gases at an angle of at least 90° to the stream of gases flowing through the duct. An upright mixing chamber is connected at its bottom to said bypass conduit to cause said diverted stream of gases to flow upward through said mixing chamber. The mixing chamber has in its lower portion at least one lateral inlet for introducing cooling air into said diverted stream of gases, and the distance between the axis of said duct and a point on the axis of said mixing chamber at the level of said inlet is from 1.5 to 3 times the square root of the quotient of the cross-sectional area of the duct divided by pi.

4 Claims, 4 Drawing Figures

APPARATUS FOR HEAT TREATING FINE-GRAIN SOLIDS

BACKGROUND OF THE INVENTION

The invention relates to an apparatus for heat treating fine-grain solids, particularly cement raw material, comprising a rotary tubular kiln, a multi-stage cyclone preheater through which the waste gases of the rotary tubular kiln pass, and a bypass conduit connected to the conduit between the rotary tubular kiln and the cyclone preheater, for branching off part of the kiln waste gases, a mixing chamber with a fresh air connection being provided in said bypass conduit for cooling the branched-off sub-flow.

In the pretreatment of fine-grain solids, in particular cement raw material, in plants of the aforementioned type the waste gases of the rotary tubular kiln frequently contain noxious materials (such as alkalis and chlorides) which can produce a troublesome accumulation in the preheater. To avoid such accumulation, it is known to withdraw part of the kiln waste gases via a so-called bypass conduit (bypassing the cyclone preheater), to cool them with the aid of fresh air in a mixing chamber and then to remove the noxious materials from this sub-flow.

Various constructions and arrangements of such mixing chambers in the bypass conduit are known. These known mixing chambers are all arranged at a relatively great distance from the point at which the bypass conduit branches off the connecting conduit between the rotary tubular kiln and the cyclone preheater.

In the operation of such known apparatus considerable problems have been frequently encountered. Due to the high temperature of the kiln waste gases the lining of the section of the bypass conduit which connects the conduit disposed between the rotary tubular kiln and the cyclone preheater to the mixing chamber is subject to considerable wear. Furthermore, since the sub-flow of the kiln gases passing through said bypass conduit frequently has a high dust content, and the noxious substances (such as alkalis and chlorides) have a strong tendency to form deposits in a critical temperature range, in these known constructions considerable depositing occurs in said section of the bypass conduit and in the mixing chamber, and this often leads to disturbances in operation and makes frequent cleaning necessary.

Accordingly, the object of the invention is to obviate these disadvantages and to construct an apparatus of this type in such a way that even with a high content of noxious substances in the kiln waste gases in the bypass conduit (in particular the section thereof leading to the mixing chamber) and in the mixing chamber itself, no troublesome deposits are formed.

SUMMARY OF THE INVENTION

This object is achieved according to the invention by the combination of the following features:
(a) The bypass conduit is connected to the conduit between the rotary tubular kiln and the cyclone preheater in such a manner that the branched-off sub-flow is deflected at an angle of at least about 90° to the direction of flow of the kiln waste gas flowing to the cyclone preheater;
(b) the section of the bypass conduit connected to the conduit provided between the rotary tubular kiln and the cyclone preheater is connected adjacent to the bottom of the mixing chamber, through which the gases flow substantially in a vertical direction;
(c) the distance between the mixing chamber (at the level of the fresh-air connection) and the flow axis of the waste gas stream flowing from the kiln to the cyclone preheater, which axis extends through the centre of gravity of the cross-sectional area (F) of the connecting conduit (in the region of the connection point of the bypass conduit) is 1.5 to 3 times, preferably 1.5 to 2.2 times, the square root of $F/\pi$.

The waste gas stream passing from the rotary tubular kiln to the cyclone preheater is deflected via the connecting line so that centrifugal force acts on the dust particles contained in the waste gas stream in this deflection zone, and the dust is not distributed uniformly over the cross-sectional area of the connecting conduit; on the contrary, a certain dust enrichment results in the outer regions of the flow deflection and a certain depletion of dust particles in the inner regions of the flow deflection. According to feature (a) the sub-flow branched off (basically from the inner region of the deflection zone, of low dust content) is deflected again at an angle of at least about 90° with respect to the waste gas stream flowing to the cyclone preheater. Since on this deflection further dust particles precipitate out of this branched-off sub-flow, the stream of waste gases flowing through the bypass conduit and the mixing chamber has a relatively low dust content. This in itself substantially reduces the danger of troublesome depositions.

According to feature (b) the arrangement of the mixing chamber and its connection to the bypass conduit are such that the gases pass substantially in a vertical direction through the mixing chamber, and the latter is open towards the bottom. As a result, dust particles precipitating in the mixing chamber can emerge freely downwardly out of the mixing chamber, further reducing the danger of troublesome agglomerations in said chamber.

Finally, according to the particularly important feature (c) of the invention an especially small distance is provided between the mixing chamber and the point at which the bypass conduit branches from the connecting conduit provided between the rotary tubular kiln and the cyclone preheater. This substantial shortening of the flow path from the branching point to the region in the mixing chamber in which the temperature is reduced by the fresh air supplied has proved particularly important in obtaining troublefree operation. For extensive tests have shown that the difficulties encountered in the known embodiments were due primarily to the relatively great distance between the branching point and the mixing chamber. In particular with varying operating conditions (fluctuations of temperature, gas quantity, dust content, proportions of noxious substances, etc.), it cannot be avoided in practice, with the known constructions, that along the relatively long flow path of the section of the bypass conduit leading to the mixing chamber troublesome depositions occur. This problem is solved according to the invention by locating the mixing chamber particularly close to the branching point (in conjunction with the features (a) and (b) which reduce the dust deposition).

Preferred embodiments of the invention are set forth in the subsidiary claims.

DESCRIPTION OF THE PREFERRED EMBODIMENT

Figure 1:
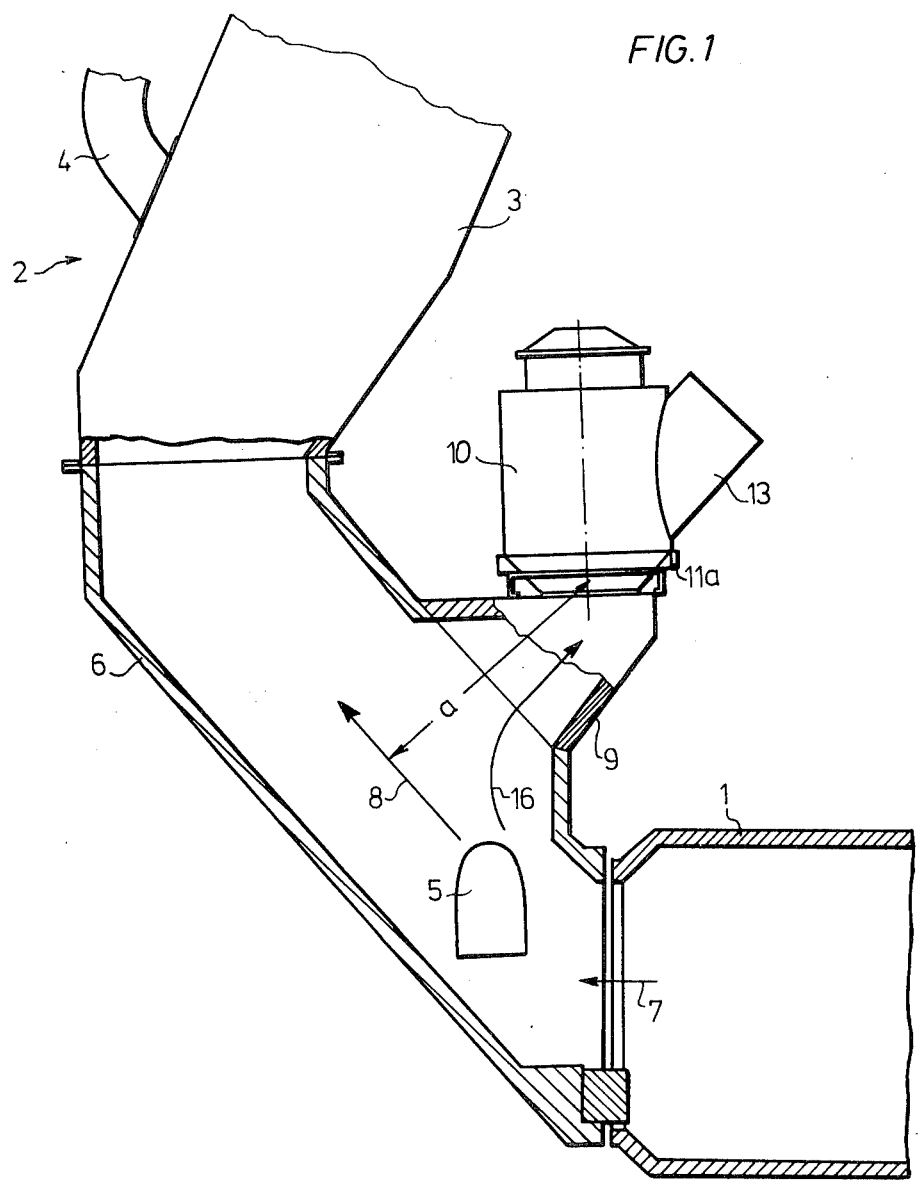
FIG. 1 is a partial section through an apparatus according to the invention.
Figure 2:
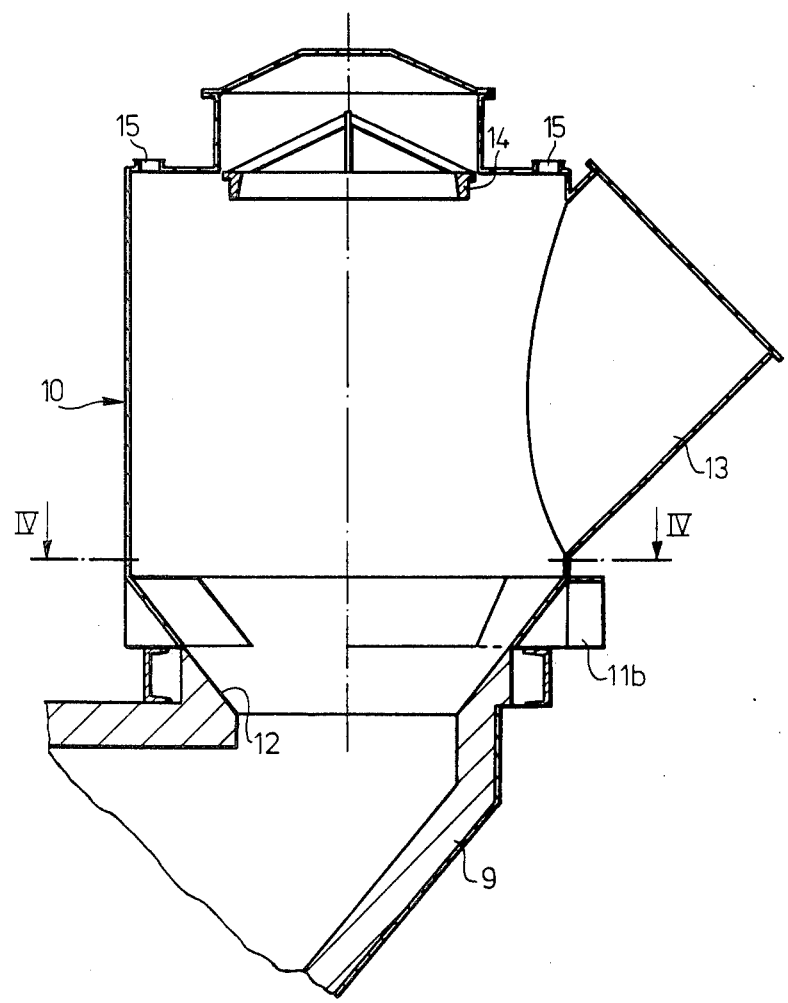
FIG. 2 is a partial section through the mixing chamber (on an enlarged scale)
Figure 3:
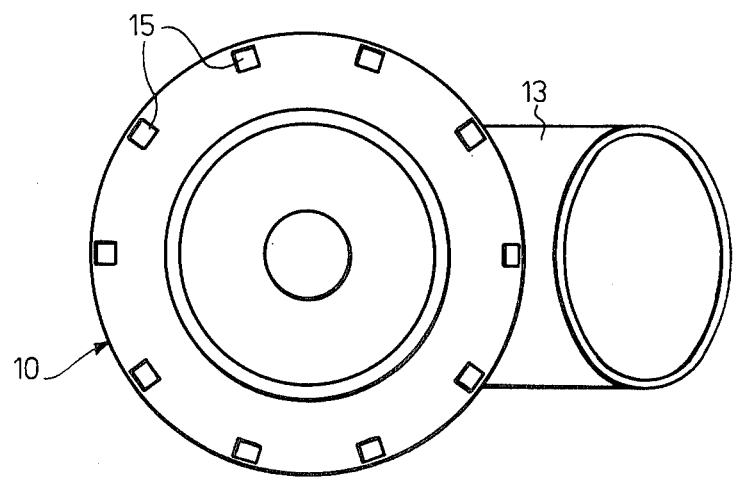
FIG. 3 is a plan view of the mixing chamber according to FIG. 1.
Figure 4:
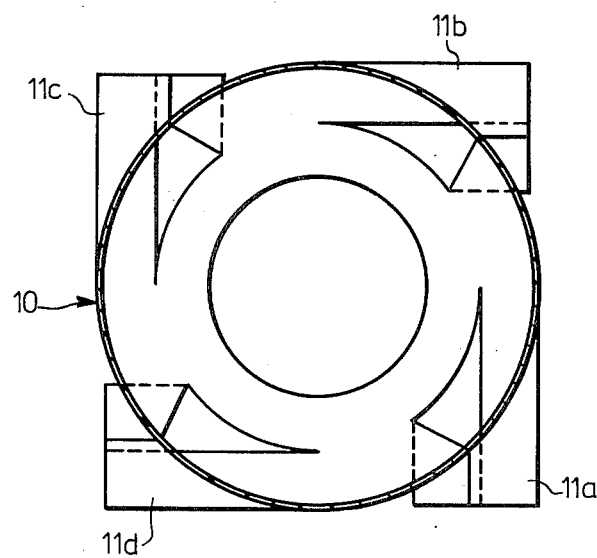
FIG. 4 is a section along the line IV—IV of FIG. 2.

The apparatus for heat treating fine-grain solids, particularly cement raw material, is only partially shown in FIG. 1. It comprises a rotary tubular kiln 1, and a multi-stage cyclone preheater 2 through which the waste gases of the kiln 1 flow; of this preheater, only the gas conduit 3 leading to the lowermost cyclone stage, the material discharge conduit 4 of the second-lowermost cyclone stage and the outlet 5 of the material discharge conduit of the lowermost cyclone stage are illustrated. A connecting conduit 6 conducts the waste gases of the rotary tubular kiln 1 to the cyclone preheater 2.

The connecting conduit 6 is somewhat inclined to the vertical so that the waste gases (arrow 7) emerging from the rotary tubular kiln 1 are deflected somewhat upwardly through an angle of less than 90° (cf. arrow 8).

On the inside of the deflected flow (i.e. in the region of the upper wall of the inclined connecting conduit 6) a bypass conduit is connected whose initial section 9 has the form of a relatively short chute-like pipe. This section 9 of the bypass conduit opens into a mixing chamber 10 which in its lower region comprises nozzles 11a to 11d distributed uniformly over its periphery, for the fresh air supply. These nozzles are so arranged that the fresh air enters the chamber 10 tangentially at four points on the periphery of said chamber.

In the region of the nozzles 11a to 11d and in the region 12 therebelow the mixing chamber is constructed as a short funnel which merges into the section 9 of the bypass conduit.

The mixing chamber 10 is further provided with a laterally upwardly inclined connection 13 for the section (not shown) of the bypass conduit carrying the mixture of kiln waste gases and fresh air. This section (not illustrated) of the bypass conduit leads the cooled mixing gases for example to a further cooler or directly to an electric precipitator.

The mixing chamber 10 further comprises a bell-shaped closure member 14 which can be lowered vertically within the mixing chamber 10 until it comes into sealing engagement on the funnel-like region 12. In this manner the bypass conduit may be shut off when required. Openings 15 in the cover of the mixing chamber 10 permit access to the interior of said chamber when necessary.

As particularly apparent from FIG. 1, a sub-flow of waste gases (arrow 16) is branched off through the bypass conduit (section 9) and by this branching off is deflected through an angle of about 90° with respect to the kiln waste gas flow (arrow 8) to the cyclone preheater 2. Although the branched-off sub-flow has in any case a relatively low dust content because it is withdrawn on the inside of the flow of the waste gases deflected after leaving the kiln, a further dust depletion results from the second deflection which the branched-off sub-flow (arrow 16) undergoes with respect to the main gas flow (arrow 8). Dust particles which are nevertheless entrained and precipitated for example in the mixing chamber 10 by the intensive mixing of the hot gas with the tangentially supplied fresh air are returned to the connecting conduit 6 via the funnel-like lower part of the chamber 10 and the chute-section 9 of the bypass conduit.

This arrangement alone substantially reduces the troublesome dust deposits and caking in the section 9 of the bypass conduit and in the mixing chamber 10; a further substantial improvement in this respect is achieved by the arrangement of the mixing chamber 10 particularly close to the connecting conduit 6. The distance between the mixing chamber 10 (at the level of the fresh-air nozzles 11a to 11d) and the flow axis of the waste gas stream (arrow 8) flowing to the cyclone preheater, which axis extends through the centre of gravity of the cross-sectional area F of the connecting conduit 6 (in the region of the connecting point of the bypass conduit, at section 9) is denoted by a; according to the invention this distance a is 1.5 to 3 times, preferably 1.5 to 2.2 times, the square root of $F/\pi$.

If for example the connecting conduit 6 has a cross-section of 4×3.5 m the distance a is between 3.2 and 6.3 m, preferably between 3.2 and 4.6 m.

I claim:

1. Apparatus for heat treating fine grain solids, comprising a rotary tubular kiln, a preheater for material supplied to the kiln, and a duct inclined to the vertical and leading from one end of the kiln to the preheater, for conducting waste gases from the kiln to the preheater, wherein the improvement comprises
    (a) a bypass conduit connected to the upper wall of said inclined duct for diverting part of said waste gases, which extends from the duct at an angle of about 90°,
    (b) an upright mixing chamber which is connected at its bottom to said bypass conduit to cause said diverted stream of gases to flow upward through said mixing chamber,
    (c) the lower portion of the interior of said mixing chamber is funnel shaped, and the initial section of the bypass conduit which opens into said mixing chamber has the form of a short chute-like pipe;
    (d) said mixing chamber having in its lower portion at least one lateral inlet for introducing cooling air into said diverted stream of gases, and the distance between the axis of said duct and a point on the axis of said mixing chamber at the level of said inlet being from 1.5 to 3 times the square root of the quotient of the cross-sectional area of the duct divided by pi.

2. Apparatus according to claim 1 wherein a plurality of nozzles for introducing cooling air are uniformly distributed around the lower portion of the mixing chamber at substantially the same level and directed substantially tangentially.

3. Apparatus according to claim 1, wherein the mixing chamber is provided with a closure member which is vertically lowerable to seat in said funnel-shaped portion.

4. Apparatus according to claim 1, wherein the mixing chamber is provided with a lateral upwardly inclined outlet connection for the mixture of waste gases and cooling air.

* * * * *